US007044152B2

(12) United States Patent
Scalzi et al.

(10) Patent No.: US 7,044,152 B2
(45) Date of Patent: May 16, 2006

(54) APPARATUS FOR IN-SITU REMEDIATION USING A CLOSED DELIVERY SYSTEM

(75) Inventors: Michael Scalzi, Doylestown, PA (US); Wade Meese, Worthington, OH (US)

(73) Assignee: Innovative Environmental Technologies, Inc., Doylestown, PA (US)

( * ) Notice: Subject to any disclaimer, the term of this patent is extended or adjusted under 35 U.S.C. 154(b) by 413 days.

(21) Appl. No.: 10/677,322

(22) Filed: Oct. 3, 2003

(65) Prior Publication Data

US 2004/0129319 A1 Jul. 8, 2004

Related U.S. Application Data

(60) Provisional application No. 60/437,981, filed on Jan. 6, 2003.

(51) Int. Cl.
*B67D 5/54* (2006.01)
(52) U.S. Cl. .................. 137/208; 137/256; 137/266; 137/565.29; 137/899
(58) Field of Classification Search ............... 137/208, 137/209, 255, 256, 266, 565.29, 565.3, 899
See application file for complete search history.

(56) References Cited

U.S. PATENT DOCUMENTS

| 494,061 | A | * | 3/1893 | Day ....................... 137/266 |
| 1,929,659 | A | * | 10/1933 | Trumble et al. ............ 137/266 |
| 2,362,674 | A | * | 11/1944 | Spangler et al. ........... 137/256 |
| 2,421,765 | A | * | 6/1947 | Taylor ..................... 137/208 |
| 2,424,440 | A | * | 7/1947 | Duffy ...................... 137/208 |
| 2,617,765 | A | * | 11/1952 | Swarr ..................... 137/208 |
| 2,966,921 | A | * | 1/1961 | Whiteman ................. 137/266 |
| 3,486,297 | A | * | 12/1969 | Eisinga et al. ............. 137/208 |
| 3,805,819 | A | * | 4/1974 | Etter ...................... 137/208 |
| 5,602,296 | A | | 2/1997 | Hughes et al. |
| 5,833,855 | A | | 11/1998 | Saunders |
| 6,245,235 | B1 | | 6/2001 | Perriello |
| 6,255,551 | B1 | | 7/2001 | Shapiro et al. |
| 6,312,605 | B1 | | 11/2001 | Kerfoot |
| 6,344,355 | B1 | | 2/2002 | Hince et al. |

\* cited by examiner

*Primary Examiner*—John Rivell
(74) *Attorney, Agent, or Firm*—Gregory J. Gore

(57) ABSTRACT

A pressurized delivery system for in-situ delivery of sub-soil remediation compounds to underground contaminated matter includes a liquid diaphragm pump connected to an inflow source of water, the pump being also in fluid communication with a plurality of bioslurry tanks connected in parallel, the bioslurry tanks each having a drain. Valve means are located between the liquid diaphragm pump and each of the bioslurry tanks for controlling either the alternate or simultaneous flow of fluid from the pump to each of the bioslurry tanks. A second liquid diaphragm pump having an inlet port for receiving the combined flow of the bioslurry tanks has an outlet in fluid communication with a system discharge port. The system further includes a source of compressed gas in fluid communication with the discharge port. A discharge rod is connected to the discharge port for delivery of remedial fluids to underground soils. A gas pressure line leads from a source of compressed gas to the discharge port and is also in fluid communication with the feed tanks for storage of injectants under pressure, the feed tanks being individually pressurized by the selective fluid communication with the pressure line. Each feed tank includes a separately valved exhaust port connected to the system discharge port such that the source of injectant may be switched from the bioslurry tanks to any of the feed tanks without loss of delivery pressure. The source of pressurized gas may be a mechanical compressor or a stored compressed gas.

7 Claims, 1 Drawing Sheet ized delivery vessels and mechanical pumping systems. The system utilized allows for a variety of dissimilar compounds to be delivered via a single injection line. Further, the switching between feed systems is accomplished without any loss of pressure to the delivery line eliminating the common problems experienced from the vacuum developed down-hole as pressure is released and reapplied. The flexibility, and thus the field success of the system, is due to the unique configuration of gas and liquid feed systems allowing for greater horizontal infiltration below grade and delivery to low permeability soils such as compacted clays which is readily accomplished. Lastly, the current system may be mounted in a mobile trailer, being fully self-contained and requiring no electrical external supply. The only site utility requirement is an available water source for slurry preparation. Other objects and advantages of the present invention will be readily apparent to those of skill in the art from the following drawing and description of the preferred embodiment.

APPARATUS FOR IN-SITU REMEDIATION USING A CLOSED DELIVERY SYSTEM

The present application is related to provisional patent application ser. No. 60/437,981 entitled "Apparatus for In-Situ Remediation Using a Closed Delivery System" filed on Jan. 6, 2003, priority from which is hereby claimed.

FIELD OF THE INVENTION

The present invention relates to apparatus for the subsurface injection of remedial liquids, slurries and colloidal suspensions to treat impacted groundwater and soils.

BACKGROUND OF THE INVENTION

There are many methods and apparatus purposed for the treatment of contaminated matter. Burying the material, incineration, vacuum extraction, and microbial mineralization are just a few available options. Burying the waste is commonly how radioactive and recalcitrant materials are treated. Solids are deposited in shallow trenches about three meters wide and between three and five meters deep. When the waste is filled to about one meter from the top of the trench, the trench is covered with earth. A large volume of heterogeneous contamination is produced by such waste which may continuously seep into the soil and water. Incineration is another available option. The purpose of incineration is to burn off the contaminants and leave only the clean soil. However, this may be a very expensive process and not very feasible if large volumes of soil need to be treated. Also, it may have pollution side effects of vapor and air pollution while the soil is being removed and moved to the incineration site. Soil Vacuum Extraction (SVE) is a simple and economical treatment method, however organochloric compounds in a concentration of several ppm or lower may not be readily removed when entrained within clays or loams. Further channeling is frequently found within a SVE system, further reducing the system's overall efficacy. Lastly, many compounds with poor Henry's Constants will not be efficiently removed via an SVE approach. This physical approach remediation process requires time in annual scale.

In order to solve the problems with the above-described methods, biological or in-situ oxidation processes have been devised. Critical to any in-situ injection process is the efficient delivery of materials to the targeted area or zone. Frequently materials may be injected by way of a cylindrical delivery rod with an expendable point. This point is pushed out to allow for pumped material to escape from the base of the injected point. In-situ remediation allows for petroleum hydrocarbon, chlorinated solvents, metals and radonuculi to be treated without any digging of the soil, so it can be performed where other treatment approaches may not be practical.

In order to perform in-situ treatments, an apparatus for delivery is needed. The most common and practical is a steel injection rod forced into the soil which causes preferential pathways when materials are forced from its terminus, often along the interface between the rod and the soil. These pathways prevent efficient application of remedial materials to the target zone. To alleviate this problem, a hollow injection rod with lateral discharge holes allows for liquids to be injected into the contaminated material and, when performed well, in-situ injections are not only practical but also very economical. However, problems exist, for example switching between feed systems cannot be accomplished without loss of pressure to the delivery line. The resulting vacuum causes the delivery pathways to close and results in reduced lateral distribution of delivered materials. It is because of these problems experienced from the vacuum developed downhole as pressure is released and reapplied that many remedial technologies fail when transitioned from laboratory to field application. This is a problem that is further exacerbated when it is desired to deliver dissimilar compounds sequentially for appropriate remediation to occur.

SUMMARY OF THE INVENTION

The applicants have devised a closed, pressurized delivery system for in-situ delivery for sub-soil remediation compounds to underground contaminated matter which includes first a liquid diaphragm pump connected to an inflow source of water, the liquid diaphragm pump being also in fluid communication with a plurality of bioslurry tanks connected in parallel, the bioslurry tanks each having a drain. Valve means are located between the first liquid diaphragm pump and each of the bioslurry tanks for controlling either the alternate or simultaneous flow of fluid from the first pump to each of the bioslurry tanks. A second liquid diaphragm pump having an inlet port for receiving the combined flow of the bioslurry tanks has an outlet in fluid communication with a system discharge port. The system further includes a source of compressed gas in fluid communication with the discharge port. A discharge rod is connected to the discharge port for delivery of remedial fluids to underground soils. A gas pressure line leads from a source of compressed gas to the discharge port and is also in fluid communication with a plurality of feed tanks for storage of injectants under pressure, the feed tanks being individually pressurized by the selective fluid communication with the pressure line. Each feed tank includes a separately valved exhaust port connected to the system discharge port such that the source of injectant may be switched from the bioslurry tanks to any of the feed tanks without loss of delivery pressure. The source of pressurized gas may be a mechanical compressor or a stored compressed gas.

The above-described closed delivery system utilizes a combination of gas and liquid delivery systems in which all delivery vessels are interconnected and valved, allowing for mixings, washings, filling, and discharge of materials via pressur

DETAILED DESCRIPTION OF THE PREFERRED EMBODIMENT

Figure 1:
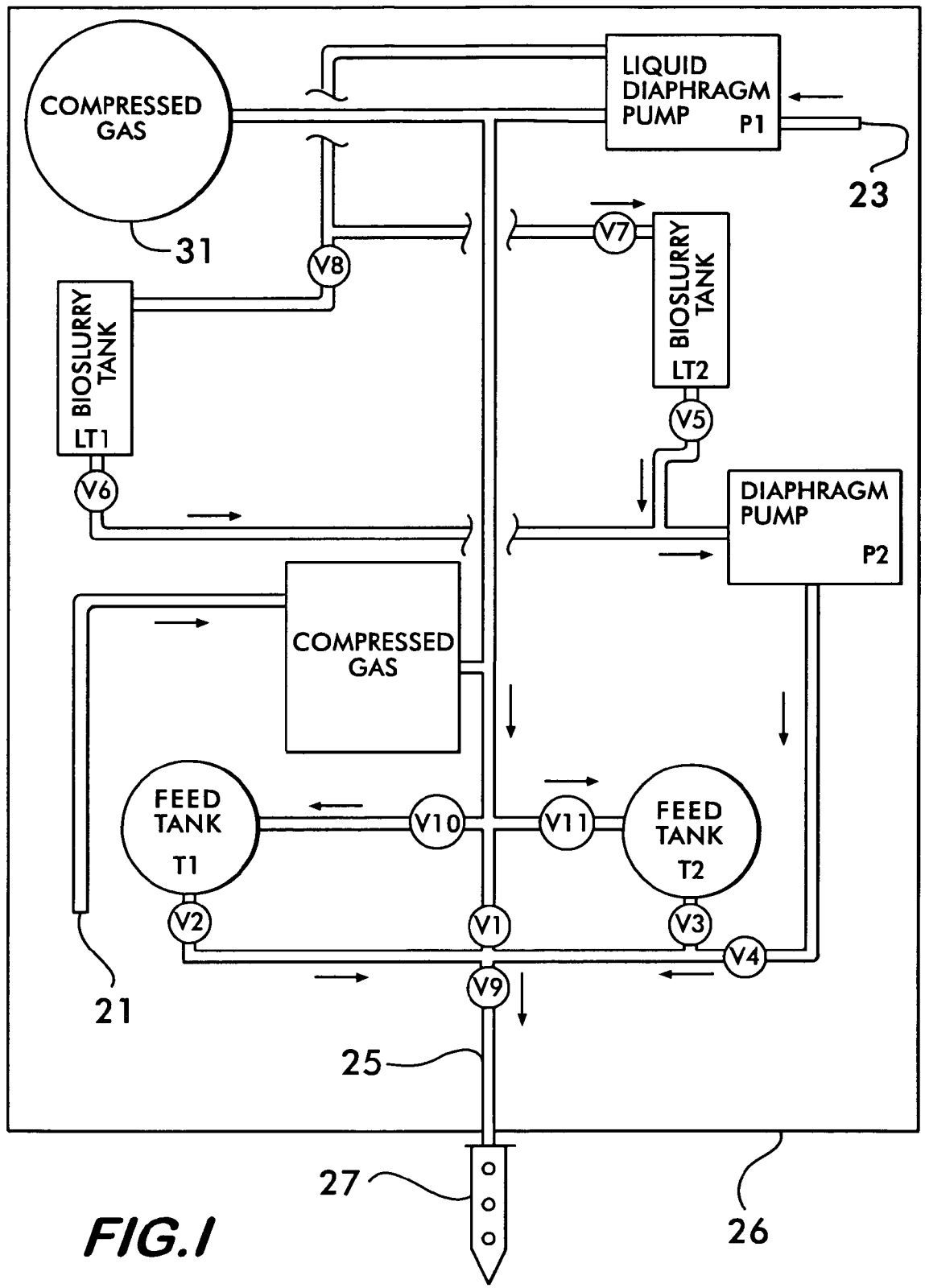
FIG. 1 is a diagram of the present invention.

Referring now to FIG. 1, a preferred apparatus is shown for carrying out the above-described process. The direction of flow is indicated by arrows where appropriate. A conventional injection rods 27 well-known in the art suitable for subsoil injections is attached to an injection line in fluid communication with the discharge port 25. The entire system is mounted in a mobile trailer 26.

The bioremediation apparatus of the invention comprises two feed tanks, T1 and T2; two bioslurry tanks, LT1 and LT2; a liquid diaphragm pump, P1; and a second liquid diaphragm pump, P2; a gas compressor; and an air storage tank. A liquid feed line from an outside water source is attached to the liquid diaphragm pump, P1. The liquid feed lines are also connected to the two bioslurry tanks, LT1 and LT2. From the two bioslurry tanks, LT1 and LT2, a liquid feed line runs to the diaphragm pump, P2. The liquid feed line then runs to the two feed tanks, T1 and T2, and out the discharge port 25.

An inlet air line 21 is attached to the gas compressor. A gas pressure line is attached from the gas compressor to the liquid diaphragm pump P1 to the two feed tanks, T1 and T2, and out the discharge port 25. All of the lines are valved, allowing for mixings, washings, filling, and discharge of materials. Valve V1 is located within the gas line running from the gas compressor toward the outlet. V2 and V3 are valves in the liquid line running to feed tanks T1 and T2. Valve V4 is the liquid line controlling the flow from pump P2. Valves V5 and V6 are located within the liquid feed line controlling flows from bioslurry tanks LT1 and LT2. V7 and V8 are liquid feed valves controlling flows into tanks LT1 and LT2. V9 is the discharge valve controlling all flow going out of the trailer. V10 and V11 are gas feed valves controlling gas flow into feed tanks T1 and T2.

The system is attached to an injection rod 27 which is a hollow, cylindrical pipe that has been drilled to a site of underground contamination with a flexible pressure hose. Under high gas pressure, the injection rod is capable of injecting horizontal and vertical pathways underground, both in deep and shallow depths. The steel injection rod has a steel tip used for drilling. In order for the high pressure streams of liquid to be injected, the rod has a series of ports drilled into the lower end of the rod. The injectants can therefore be injected in any direction.

A specific operation of the apparatus according to one embodiment of the invention may be further described in conjunction with the following process. The process begins by first filling the bioslurry tanks LT1 and LT2 and the feed tanks T1 and T2. A source of nitrogen is connected to inlet 21 and a water supply is connected to liquid inlet 23. Valves V7 and V8 are opened which engage an electric actuator to fill bioslurry tanks LT1 and LT2. A micro-nutrients/sodium sulfate is then manually added to the bioslurry tanks LT1 and LT2 and allowed to mix. Valves V7 and V8 are shut along with disengaging the actuator when the bioslurry tanks are filled.

The injectant preparation phase continues as a pre-mixed heated lactate including vitamins B2 and B12 is manually poured into feed tank T1. Valves V3, V4, V5, and V6 are then opened. Next, pump P2 is activated and tank T2 is filled with an appropriate volume of the bioslurry. All valves are closed when finished. Next, zero valent iron is manually added and mixed with the bioslurry in tank T2. The tops are then secured on both feed tanks T1 and T2 and afterward valves V10 and V11 are opened to pressurize both feed tanks. After the injection rod has been properly placed at a selected location, the injection line is secured to discharge port 25 and valve V9 is opened.

With the injectant preparation phase completed, the injection phase of the process begins. Valve V1 is opened to create injection pathways until a significant pressure drop is observed at the injection pressure vessel 31 which is filled with the source of compressed gas, preferably either nitrogen or carbon dioxide. Valve V1 is then closed and valve V3 opened to introduce the zero valent iron/bioslurry mixture into the subsurface pathways from feed tank T2. Valve V3 is closed when feed tank T2 is empty. Next, valve V2 is opened to introduce the lactate mixture into the subsurface from tank T1 and is closed after it is empty. It will be understood by those of skill in the art that switching between either the feed tanks or the bioslurry tanks occurs without loss of pressure in the injection line therefore avoiding any down-hole vacuum that would otherwise be experienced in switching from the delivery of one compound to another. This is an important aspect of the invention.

Then, valves V4, V5, and V6 are opened to directly deliver bioslurry from tanks LT1 and LT2 into the subsurface. All valves are closed when the desired amount of bioslurry has been injected. Finally, in order to cleanse the injection line of the viscous polylactate ester, a reducing agent is once again injected. With the injections complete, a post injection line purge is performed. The gas is injected to clear the lines of any remaining reducing agents. With the lines cleaned, the process is complete and the next injection location is prepared.

It should be understood that there may be other modifications and changes to the present invention that will be obvious to those of skill in the art from the foregoing description, however, the present invention should be limited only by the following claims and their legal equivalents.

What is claimed is:

1. A closed, pressurized delivery system for injection of in-situ remediation compounds such as slurries, stimulants, nutrients, biological cultures, colloidal suspensions, oxidizing agents, reducing agents and mixtures of compounds to underground, contaminated matter, comprising:

a first liquid diaphragm pump connected to an inflow source of water, said liquid diaphragm pump being in fluid communication with a plurality of bioslurry tanks connected in parallel with said first pump, said bioslurry tanks each having a drain for discharging an injectant therefrom;

valve means located between said first liquid diaphragm pump and each of said bioslurry tanks for controlling either the individual or simultaneous flow of fluid from said first pump to each of said bioslurry tanks;

a second liquid diaphragm pump having an inlet port for receiving the combined flow of injectant from said bioslurry tank drains, the second liquid diaphragm pump having an outlet in fluid communication with a system discharge port; and a source of compressed gas in valved fluid communication with said system discharge port whereby an injectant is discharged therefrom under pressure.

2. The delivery system of claim 1 further including an injection rod in fluid communication with said total system discharge port for the delivery of remedial fluids to underground soils.

3. The delivery system of claim 2 further including a gas pressure line leading from said source of compressed gas to said system discharge port, the line also being in separate valved fluid communication with each of a plurality of feed tanks for storage of injectant under pressure, said feed tanks each including a separately valved exhaust port in fluid communication with said system discharge port such that the source of injectant, by operation of the exhaust port valves, can be changed from one tank to another without loss of delivery pressure.

4. The delivery system of claim 3 wherein each of said feed tanks is in fluid communication with said pressure lines such that each tank may be individually pressurized.

5. The delivery system of claim 4 wherein said source of pressurized gas is delivered by a mechanical compressor.

6. The delivery system of claim 4 wherein said source of pressurized gas is a stored compressed gas source.

7. The apparatus according to claim 1 wherein the liquid diaphragm pump, bioslurry tanks, compressor, diaphragm pump and feed tanks are mounted in a mobile trailer such that an entire functional closed injection delivery system may be transported as a unit.

* * * * *